March 4, 1958 E. J. WENDELL 2,825,527
ROTARY VALVES

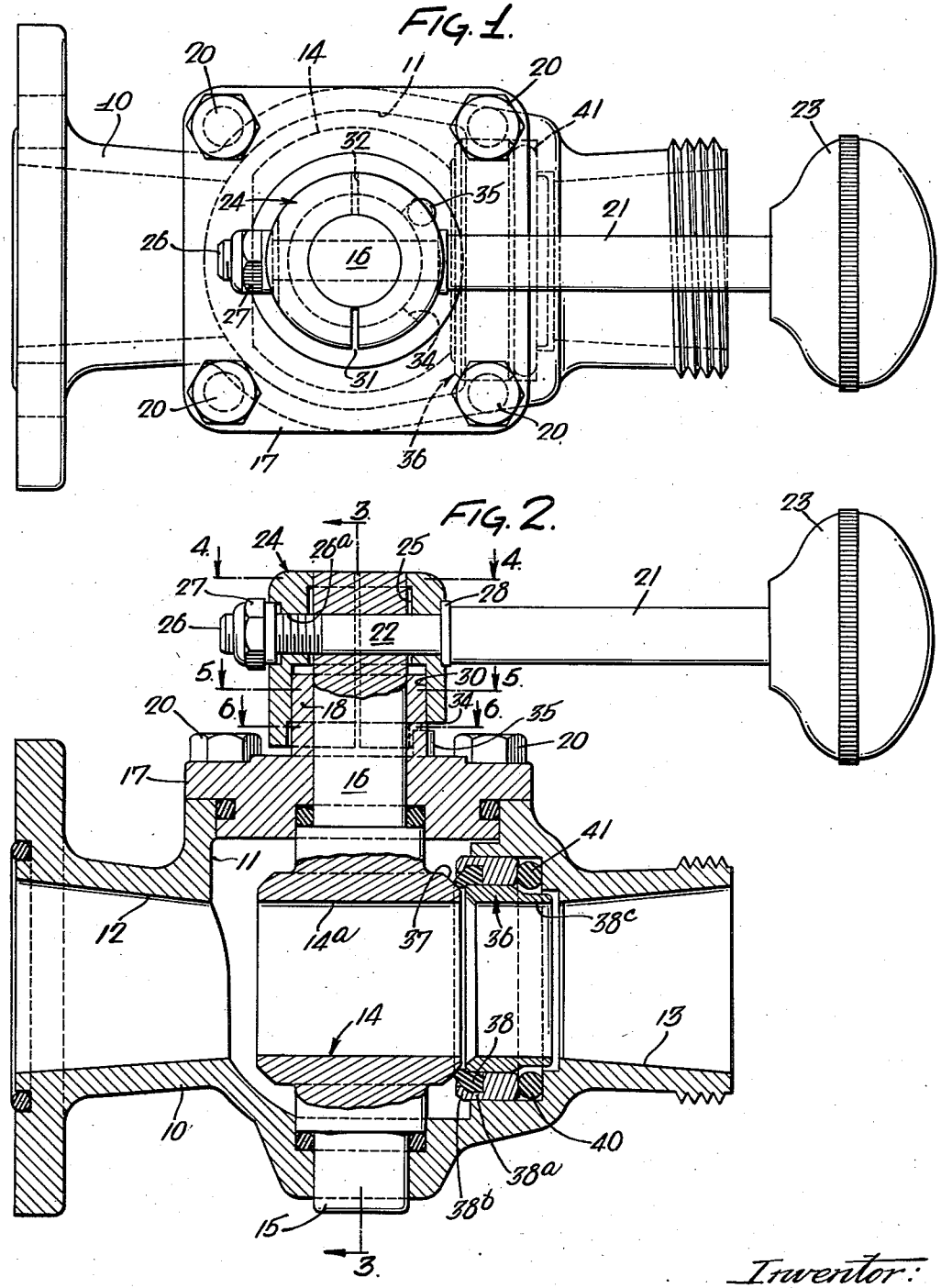

Original Filed Dec. 13, 1954 2 Sheets-Sheet 2

Inventor:
Evert J. Wendell
by Howson & Howson
Attys.

United States Patent Office 2,825,527
Patented Mar. 4, 1958

2,825,527

ROTARY VALVES

Evert J. Wendell, Wayne, Pa., assignor to Hale Fire Pump Company, Conshohocken, Pa., a corporation of Pennsylvania Original application December 13, 1954, Serial No. 474,781. Divided and this application November 10, 1955, Serial No. 546,191

9 Claims. (Cl. 251—96)

This application is a division of my co-pending application Serial No. 474,781, filed December 13, 1954.

The present invention relates to valves and more particularly to valves of the rotary type adapted for controlling the discharge of fluids under relatively high pressures.

A principal object of the present invention is to provide a novel and improved means for locking a valve in its open, closed and intermediate positions;

Another object is to provide a valve control wherein a hand operated lever operates not only to open and close the valve but also to actuate an improved means for locking the valve in one or another of its alternative positions;

Still another object of the invention is to provide a locking means for valves of rotary type operatively associated with the valve stem and adapted to operate in the locking function in a manner excluding application of axial thrust on the stem.

In the accompanying drawings:

Fig. 1 is a plan view of a valve embodying one form of the present invention;

Fig. 2 is a medial, vertical sectional view on line 2—2 of Fig. 1 but showing the operating handle in elevation;

Figure 4:
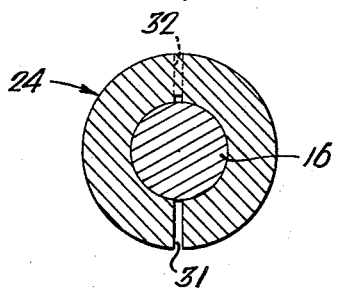
Fig. 4 is a section on line 4—4 of Fig. 2.
Figure 5:
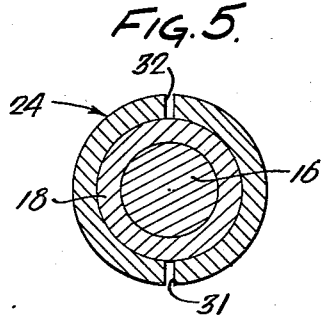
Fig. 5 is a section on line 5—5 of Fig. 2.
Figure 6:
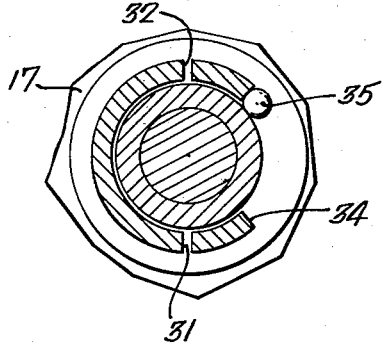
Fig. 6 is a section on line 6—6 of Fig. 2.

Referring to the drawings, one embodiment of the invention comprises a valve casing 10 having a valve chamber 11 communicating with two ports 12 and 13, one of which serves as an inlet for fluid under pressure and the other as a discharge outlet according to the direction of fluid flow. In the present instances the two ports 12 and 13 are in axial alignment for straight through flow but may be angularly disposed according to conditions of use.

The chamber 11 houses a rotary valve element 14 in the form of a truncated sphere arranged to rotate about a vertical axis defined by a trunnion 15 journalled in a wall of the casing 10 and a stem 16 which is journalled in a cover plate 17 constituting an element of the casing and which has an integral collar 18 forming an extended bearing for the said stem. The cover plate 17 is attached to the body of casing 10 by studs 20 or other suitable fastening means. The valve stem 16 extends from the collar 18 for attachment of a valve-operating hand lever 21 which passes through a transverse hole in the stem 16. The stem hole and the mating portion 22 of the lever are cylindrical in this instance to permit turning of the lever 21 about its own axis relative to the stem for a purpose hereinafter described. As so assembled the lever 21 can be moved angularly about the axis of the stem for valve control and can also be turned about its own longitudinal axis. The lever 21 terminates at one end in a hand knob 23.

In order to lock the valve 14 in any position, to which it may have been adjusted in the chamber 11 by actuation of the lever 21, a locking sleeve 24 is provided having a bore 25, which receives the valve stem 16, and having also diametrically opposite apertures for passage of the part 22 of the lever. The terminal end 26 of the lever projects beyond the outer face of the sleeve 24 and is threaded and a self-locking nut 27 is threaded upon the end 26 to secure the lever in the sleeve. The threaded end 26 of the lever also finds mating threads 26a in the wall of the sleeve 24. A collar 28 is formed on the lever 21 to abut the opposite outer face of the said sleeve. The sleeve 24 also has a larger bored extension 30 which snugly embraces the collar 18. The sleeve has diametrically opposite slots 31 and 32, which parallel the axis of the stem 16 and which lie in a vertical plane intersecting the axis of the lever 21. The slot 31 extends the full axial length of and therefor splits the sleeve. The slot 32 extends continuously from the lower end of the sleeve to a line 33 near the top, so that a small section of metal 33a remains to hold the two halves of the sleeve together.

Figure 3:
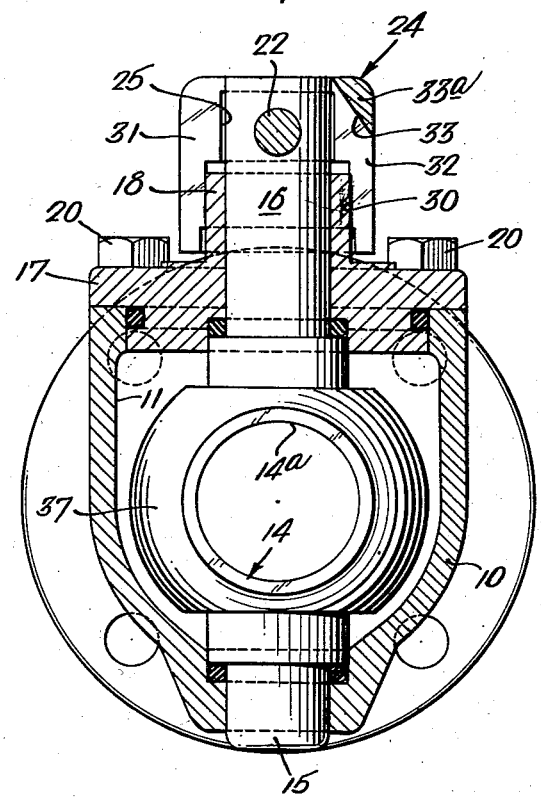
Fig. 3 is a section on line 3—3 of Fig. 2.

With the foregoing construction, if the lever 21 is turned clockwise, as viewed in Fig. 3 and assume a right hand screw thread at 26, 26a, the two halves of the sleeve 24 on opposite sides of the slots 31, 32 will be drawn together, with flexure along or in the area of the line 33. In this manner the sleeve will be brought into clamping relation with the collar 18 of the casing which will have the effect of anchoring the stem 16 (and valve 14) to the casing. If the lever is then turned counterclockwise about its axis from the clamping position, the sleeve will be expanded and freed from the collar 18, and the valve will then be free for adjustment in the chamber 11 about the common axis of the stem 16 and trunnion 15 by manipulation of the lever 21. Obviously the device provides a means operative by manipulation of a single lever for adjusting the valve and for anchoring it securely in adjusted position.

For the purpose of limiting the angular movement of the valve, and to define the fully open and closed positions of the valve 14, a portion of the bottom of the sleeve 24 is cut away to form an arcuate slot 34 which in the assembly registers with a stop pin 35 upstanding from the cover 17.

As a means for effectively seating the spherical valve 14 and to preclude leakage or by-passing of the valve regardless of the magnitude of the pressure or the direction of flow, the casing about the inner end of port 13 is counterbored to receive an annular insert 36. This insert provides an annular seat 37 for the spherical surface of the valve 14. The seat 37 itself is formed by a resilient gasket 38, in the form preferably of a plastic ring, set into the face of the insert. The ring 38, which may be of the shape shown, occupies a recess 38a of complementary form in the inner end of the insert; and in the present instance the insert is composed of two section 38b and 38c the meeting cylindrical faces of which intersect the recess 38a and which may be secured together after insertion of the formed ring by force-fitting or other suitable means so as to positively confine the ring while leaving a sufficient part projecting for pressure engagement with the cylindrical face of the valve element. As shown in Figs. 2 and 3, the diameter of the ring 38 is such that the ring completely embraces the bore 14a of the valve element when the latter is in the open position so as to seal off the said bore from the chamber 11 at the inner end of port 13.

The outer end of the insert 36 is provided with a circumferential groove 40 which forms with the confronting walls of the casing 11 a pocket for reception of a plastic ring 41. The ring 41 is preferably made of resilient substantially non-compressible material soft enough to flow under pressure for a purpose described below. The function of this ring is to seal and to prevent leakage through the joint between the insert 36 and the confronting walls of the casing and also to maintain the ring 41 resiliently in seating engagement with the spherical surface of value 14.

The opening and closing of the valve takes place by the manual operation of the lever 21 as previously described. With the valve in closed position the knob 23 is turned to clamp the sleeve 24 to the fixed collar 18 and to thereby lock the valve in its closed position. To open the valve the knob 23 is turned in the opposite direction to release the valve after which the lever 21 may be operated to open the valve. With the valve open, the knob 23 is again rotated to lock the valve in the adjusted position.

In the movement of the valve between the open and closed positions the seating ring 38 is in continuous forced contact with the spherical face of the valve but not necessarily throughout its entire circumference. It will be apparent that with the spherical valve and annular valve seat of this valve structure it is important that the locking means, as in the present instance, be such as to preclude application to the valve of thrusts tending to displace the valve with respect to the seat, particularly when as in the present structure the valve is capable of limited displacement axially of the trunnion and stem.

I claim:

1. A control valve, comprising a casing having an inlet port and an outlet port, a valve in said casing for controlling communication between said ports, a stem for said valve journalled in and projecting through the casing wall, a collar on the casing embracing the stem, said stem having a transverse hole in the projecting end thereof, clamping members engaging opposite sides of said collar and having apertures registering with the said stem hole, an operating lever traversing said stem hole and apertures, and said lever having threaded engagement with one of said clamping members and a shoulder engaging the outer surface of the other of said members, whereby turning of said lever in one direction about its own longitudinal axis causes the members to draw together in clamping engagement with the said casing collar, and turning of the lever in opposite direction releases the clamping engagement and leaves the valve free for adjustment about the axis of the stem by swinging the lever about the latter axis.

2. A control valve according to claim 1 wherein said clamping members are integral parts of a split sleeve embracing said stem and collar.

3. A control valve according to claim 2 including means on said lever to limit the extent of the angular movement of the lever about its axis in the valve-releasing direction.

4. A control valve according to claim 3 wherein stop means is provided between the valve body and the sleeve to position the valve in the open and closed positions.

5. A control valve according to claim 1 wherein the valve has a spherical outer surface and wherein the casing comprises an annular sealing element in seating engagement with said spherical surface.

6. A control valve according to claim 5 wherein the valve has freedom for limited free movement in the casing axially of the stem.

7. Valve locking mechanism comprising the combination with a housing, a rotary valve therein and a valve stem protruding from the housing, of an actuating handle extending transversely through and rotatably mounted in the protruding valve stem, means for limiting axial movement of the handle, the latter having a threaded end portion projecting beyond the stem and a locking shoe engaged with said threaded end portion for movement toward the valve stem in response to rotation of the handle in one direction about its own axis, the valve housing having an arcuate portion concentric with the stem axis and located for engagement by the locking shoe in different valve setting dispositions of the actuating handle.

8. Valve locking mechanism comprising the combination with a housing, a rotary valve therein and a valve stem protruding from the housing, of an actuating handle extending transversely of and rotatably mounted in the protruding valve stem, means for limiting axial movement of the handle, the latter having a threaded portion adjacent the valve stem and a locking shoe engaged with said threaded portion for movement toward the valve stem in response to rotation of the handle in one direction about its own axis, the valve housing having an arcuate portion concentric with the stem axis and located for engagement by the locking shoe in different valve setting dispositions of the actuating handle.

9. Valve locking mechanism comprising the combination with a housing, a rotary valve therein and a valve stem protruding from the housing, of a sleeve surrounding and laterally movable with respect to the protruding valve stem, and actuating handle extending transversely of and rotatably mounted in the protruding valve stem, means for limiting axial movement of the handle, the latter having threaded engagement with a wall of said sleeve, whereby the sleeve is moved laterally of the valve stem in response to rotation of the handle in one direction about its own axis, the said sleeve having a locking portion overlying a surface of the housing and mounted for movement with said sleeve during the rotation of said handle in said one direction to engage said surface, said surface being arcuate, concentric with the stem axis, and located for engagement by the said locking portion in different valve setting dispositions of the actuating handle.

References Cited in the file of this patent

UNITED STATES PATENTS

| | | |
|---|---|---|
| 2,665,879 | Housekeeper | Jan. 12, 1954 |
| 2,745,629 | Watson | May 15, 1956 |